United States Patent Office 3,316,871
Patented May 2, 1967

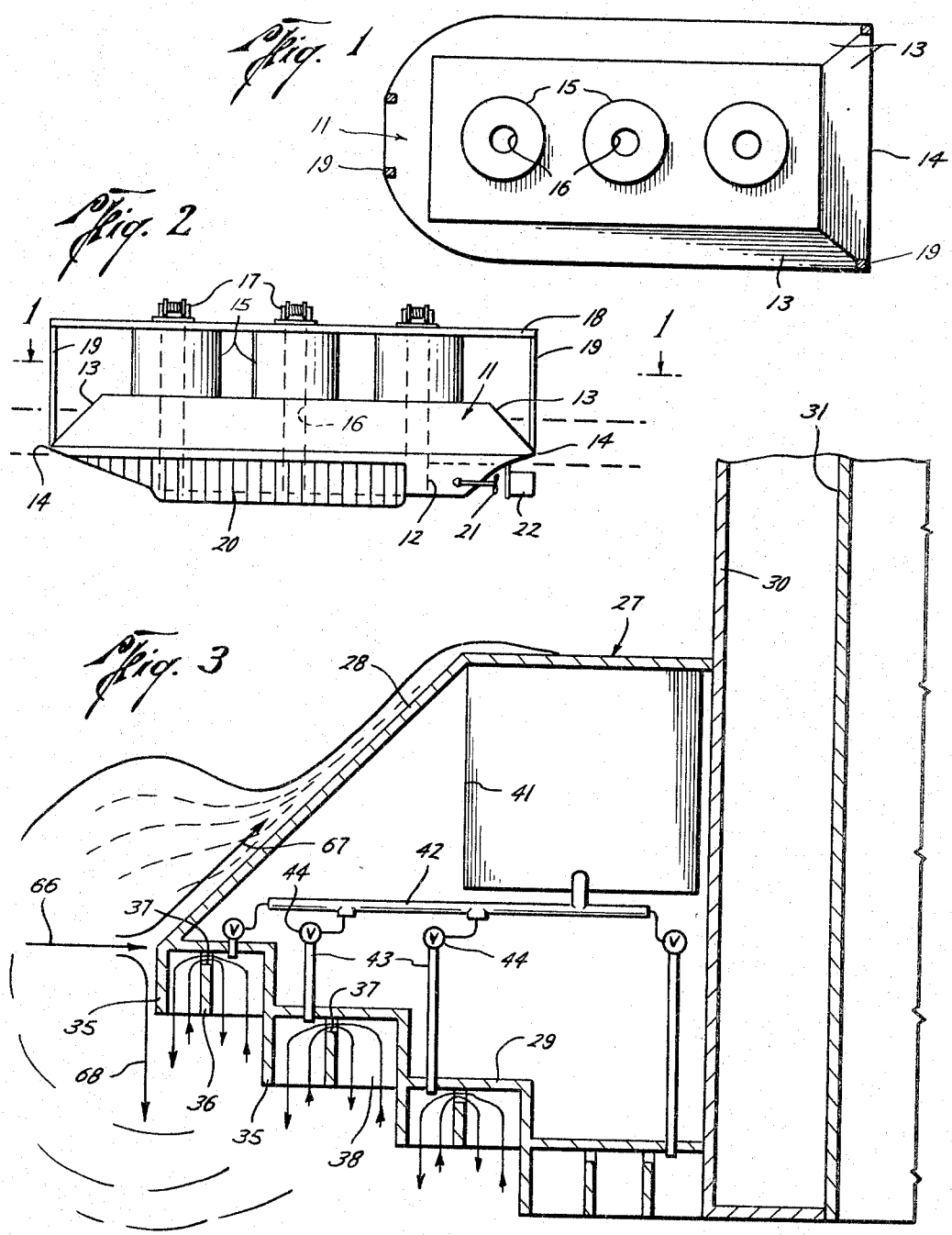

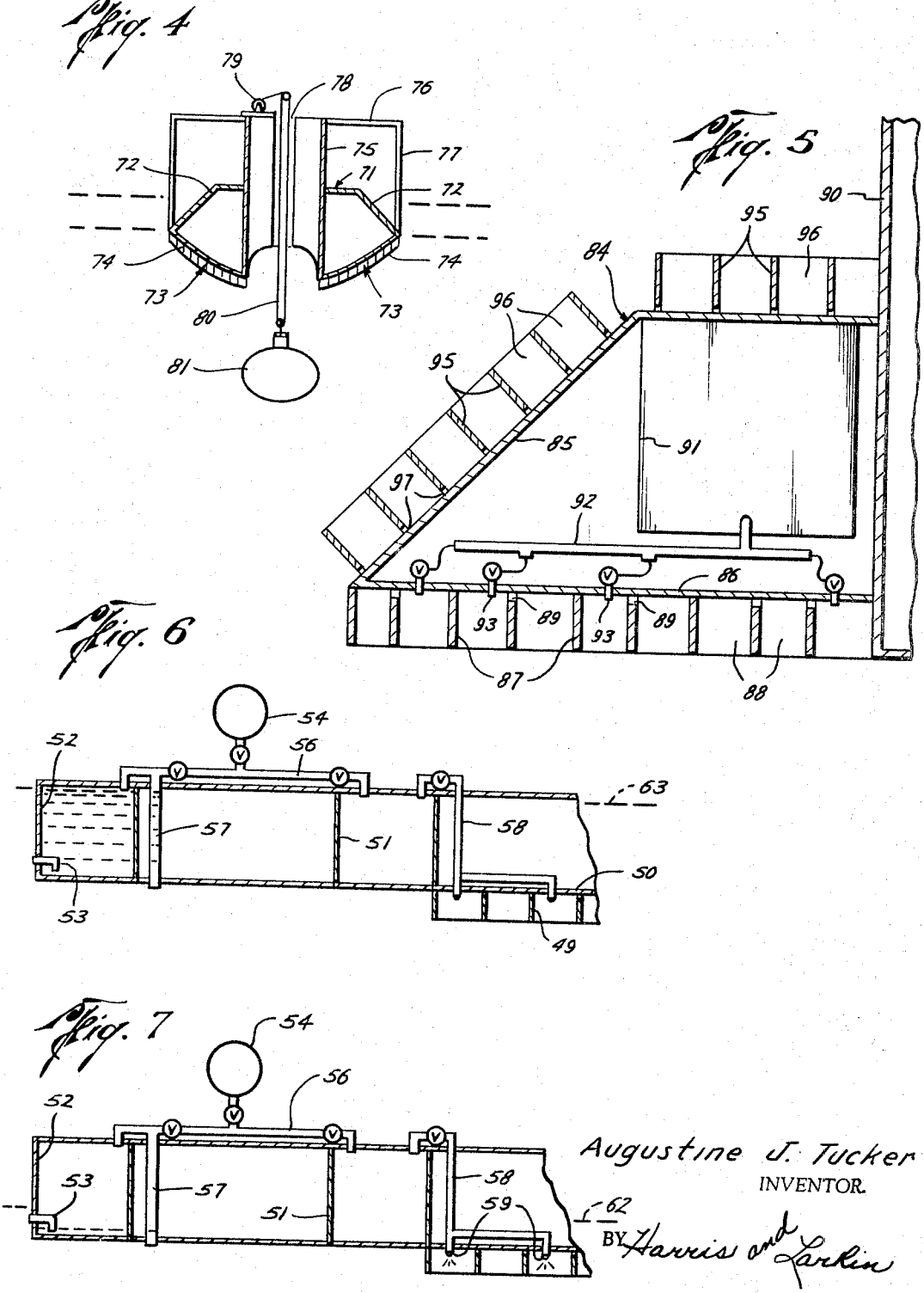

---

3,316,871
STABILIZED VESSEL FOR OPEN SEA
OPERATIONS
Augustine John Tucker, 911 S. Post Oak Lane,
Houston, Tex. 77027
Filed Jan. 27, 1966, Ser. No. 523,349
10 Claims. (Cl. 114—.5)

This invention relates to a seagoing vessel which is adapted for operation in open sea. More particularly, this invention is related to a novel seagoing vessel that has unusually good stability when subjected to wind and wave action in the open sea, which vessel may often times be moored in the open sea and serve as a support station.

Typical functions which the vessel may be used to support include marine hull salvage, marine construction, pipe line installation, mother ship service for submarines, life support for underwater residences and working stations, workover and repair of oil and gas wells which have submerged well heads and the like.

In each of these enumerated functions there is a requirement for a vessel which has the ability to remain positioned despite foul weather and heavy seas. Included in the requirements for such a vessel are that it be of such nature that it will avoid absorption of wave forces to the maximum extent and to the extent that it does absorb wave forces, that it be sluggish in its reaction thereto. These criteria are of particular importance when operating the vessel in a moored position, whether by conventional anchors or by propulsion controls. In either instance, it is important that the vessel be subjected to the least strain possible and thereby minimize the danger of being driven off station by the weather. A support vessel is much better adapted to place heavy loads, make heavy salvage lifts, provide life-line safety for divers, maintain umbilical connetcions with below surface residences and the like, if the support vessel moves as little as possible and with any motions being as slow as possible in reaction to wave and wind forces.

In the practice of marine drilling, there has come into existence a class of floating vessels sometimes referred to as semi-submersible. In these, the working deck is positioned high above the waves, which deck is connected to a submerged hull supported by deeply submerged buoyancy and ballast tanks. Connections therebetween or supports therebetween usually are in the form of tubular columns or the like. Hence, the waves roll through the aperture between the submerged hull and the working deck, with very low transmittal of wave and wind forces to the entire structure. By contrast, a vessel of this invention is designed to remain water-borne in the wave zone of the sea and is adapted to carry out its operations or purposes in this position.

It is therefore, an object of this invention to provide an improved vessel for carrying out the above enumerated operations and to provide a solution to the problems noted above.

Briefly stated, this invention may be described as a seagoing vessel which is adapted for operation in open seas. It is provided with a hull having inwardly and upwardly sloped or rounded top tides which present a relatively sharp or pointed edge to approaching waves. The vessel is also provided with a grid network attached to the bottom side of the hull, which network comprises a plurality of grid plates attached at generally right angles to the bottom surface of the hull and forming a plurality of generally downwardly facing open ended or open faced pockets.

The vessel also includes at least one generally cylindrical shaped tank mounted to extend above the top of the hull and adapted to support a work deck thereabove. Ballasting means are also mounted in the hull for raising and lowering the hull a predetermined distance relative to the water surface at predetermined times, whereby the leading edges of the sloped top sides may be submerged below the water surface when the vessel is engaged in a support operation as described above.

Reference to the drawings will further explain the invention wherein like numerals refer to like parts in which:

FIG. 1 is a top plan view of one embodiment of the invention showing a generally ship shaped hull, taken at line 1—1 of FIG. 2.

FIG. 2 is a side elevation view of the vessel as shown in FIG. 1.

FIG. 3 is a partial cross-sectional view of another embodiment of the invention showing the hull designed with a step shaped bottom portion.

FIG. 4 is a cross-sectional view of another embodiment of the invention showing a vessel which is adapted to attach to, lift and support a submarine at the lower side.

FIG. 5 is a partial cross-sectional view similar to FIG. 3 showing another embodiment of the invention.

FIGS. 6 and 7 are generally schematic representations of one form of the ballasting means that is included in a vessel of this invention, for raising and lowering the vessel relative to the water surface when the vessel is placed in position for a support operation.

Referring now to FIGS. 1 and 2, the embodiment shown therein includes a hull generally indicated by the numeral 11 having a ship shaped bottom 12, and having inwardly and upwardly sloped top sides 13 which present relatively sharp or pointed leading edges 14 to approaching waves.

There is mounted on top of hull 11 a plurality of generally cylindrical shaped tanks 15, each of which has passing downwardly therethrough a vertical shaft in the form of wells 16 which extend through bottom 12 of hull 11, whereby sea water may rise therein. Each of the wells 16 has mounted thereover which means 17 which may be used to perform work operations down through wells 16.

The vessel is also provided with a work deck in the form of upper deck 18 which is attached to the top portions of tanks 15 and is additionally supported by vertical deck supports 19 on each end thereof which are attached to hull 11.

A portion of bottom 12 of hull 11 is provided with a grid network 20 which is comprised of a plurality of grid plates attached at generally right angles to the plating of bottom 12 and form a plurality of generally downwardly facing open ended or open faced pockets. In this instance, the grid network does not cover the entire surface of bottom 12 but terminates short of propeller 21 and rudder 22 to prevent cavitation.

Referring now to FIG. 3, an alternate form of the invention is shown but which also shows a grid network in greater detail. The embodiment shown in FIG. 3 is similar to that shown in FIG. 1 and 2 with the exception that the bottom surface of the hull is step shaped. In this instance, the hull is generally designated by the numeral 27 which has inwardly and upwardly sloped topped side 28 and step shaped bottom 29 formed of shell plating or the like, with bottom 29 connecting with the bottom end of tank 30 mounted on top of hull 27 and having tube 31 extending therethrough which forms a well extending through bottom 29 of hull 27, which well is similar to well 16, as shown in FIGS. 1 and 2.

Each of the steps of bottom 29 is provided with a rim plate 35 in the form of a short width of steel plating which is attached generally perpendicularly to the shell plating of bottom 29 as by welding or otherwise. Rim plate 35 is somewhat in the form of a rolling chock or bilge keel that has sometimes been used on conventional vessels having one such type plate on either side to prevent rolling action.

Rim plate 35 has mounted adjacent thereto an intermediate plate 36 which is a plate similar to plate 35 except that it was provided with a slit opening 37 which runs generally parallel with bottom 29 and is adjacent thereto. Thus, there is provided means for communication between adjacent pockets formed between rim plates 35 and intermediate plates 36. At appropriate intervals as for example 4 to 20 feet, rim plates 35 and intermediate plates 36 are connected by transverse plates 38, which are similarly attached to bottom 29, thereby forming what may be described as a plurality of generally downwardly facing open ended or open faced pockets.

The vessel of this invention may also be provided with jet means which are connected to the grid network for the purpose of applying compressed air or other gas to the closed ends of at least a portion of the pockets at such times as it is desirable to reduce the drag on the vessel, as for example, when the vessel is underway. Accordingly, hull 27 is shown as having compressed air tank 41 mounted therein which is connected to conduit 42 which connects to a plurality of jets 43 each of which is controlled by a pressure regulated valve 44, each of which is set at a different pressure level to overcome differences in head pressures corresponding to the submerged depths of the hull. In other words, it may be stated that the valves 44 are installed to establish a pressure graduation system inversely scaled to the depth of submergence levels. Thus, when valves 44 are opened, air pressure in tank 41 is applied to jets 43 which thereby supply compressed air to the closed ends of the downwardly facing pockets formed by rim plates 35, intermediate plates 36 and transverse plates 38. The slits 37 in intermediate plates 36 permit the migration of the released air from one pocket to an adjacent pocket which eliminates the requirement of each pocket having its own jet or air source.

Ballasting means is mounted in the hull of a vessel embodying this invention for raising and lowering the hull a predetermined distance relative to the water surface at predetermined times, whereby the leading edges of the sloped sides of the hull may be submerged below the water surface when the vessel is engaged or moored in a support position. This ballasting means may be conventional systems having pumps and piping to perform the ballasting and de-watering processes. However, FIGS. 6 and 7 show a compressed air system which is a novel and efficient system of increasing and decreasing the draft of the hull to accomplish certain of the objectives of the invention. Although FIGS. 6 and 7 show a grid network 49 mounted on a flat bottomed hull 50, it is to be understood that the ballasting means hereinafter explained is also applicable with respect to the other embodiments of the invention described herein. Hull 50 is shown having a pressurized air tank 51 which corresponds to air tank 41 in FIG. 3. Hull 50 is also provided with a ballast tank 52 having a pressure sensitive water escape conduit and valve 53 which vents from the inside of tank 52 to the outside thereof in response to predetermined pressure. It is to be understood that the embodiment shown in FIG. 3 could likewise have a ballast tank similar to ballast tank 52 and a ballasting system similar to that hereinafter described in FIGS. 6 and 7.

This ballasting means also includes a main air tank 54 which is connected to an appropriate air compressor (not shown) and connects by conduit 56 to the top portion of ballast tank 52 and the top portion of air tank 51. Conduit 56 has an open ended stand pipe 57 connected thereto which acts as a safety factor in the event air pressure applied to ballast tank 52 exceeds the internal stress capacity as might occur if valve 53 were to become clogged or inoperable. In addition, air tank 51 is connected to conduit 58 which corresponds with conduit 42 in FIG. 3, which in turn connects to jets 59 which in turn are similar to jets 43 shown in FIG. 3. Jets 59 discharge into the closed ends of the pockets formed in grid network 49 in the same manner as in FIG. 3.

When the vessel is proceeding to a support position, it is desirable to have the vessel submerged to the least extent possible. Hence, the ballast tank 52 will be void of water and the vessel will be riding high with respect to underway water level 62 as shown in FIG. 7. This is accomplished by supplying pressurized air to ballast tank 52 and thereafter maintaining valve 53 in the closed position.

When the vessel has arrived at the desired support station it is lowered or partially submerged to the on station water level 63 shown in FIG. 6. This is accomplished by opening appropriate valving in conduit 56 such that the compressed air in ballast tank 52 is transmitted to reduced pressure air tank 51, thereby permitting water to enter ballast tank 52, thereby causing the partially submerged condition. In this condition the leading edge of the hull which receives the wave action, as for example, leading edge 14 of hull 11 shown in FIG. 1, is submerged an appropriate distance below the water level such that approaching waves may be sheared or divided roughly into a top half and a bottom half which is accomplished when the vessel is partially submerged with respect to water line 63 as shown in FIGS. 2 and 6, as distinguished from the underway water line 62 as shown in FIGS. 2 and 7.

For purposes of explanation, reference will now be made to FIG. 3 to explain certain of the advantages of the present invention with respect to resistance to wave action. A wave normally has a height and depth relative to the calm water line. When it is sliced horizontally approximately in half by the leading edge of the hull, the top portion of the wave will roll over the inwardly and upwardly sloped top side 28 of the hull with very little impact thereagainst. With the wave approaching in the direction of arrow 66, it will be sliced generally in half with the top portion proceeding in the direction of arrow 67 and the bottom half in the direction of arrow 68.

The wave has within it, also, a rotational force caused by the inner action of the particles of water under the energy of forward motion and the changes in hydrostatic head pressure as the wave progresses. For the most part, it is thought that the lower portion of the wave comprises these inner forces. With a grid system such as that shown in the various figures herein, which grid system may lie both transversely and/or longitudinally of the hull and have the slit openings 37 as shown in FIG. 3, and elsewhere, the internal rotating forces in the lower half of the wave are dispersed. Although the force of the wave striking rim plates 35, intermediate plates 36 and transverse plates 38 will have an impact force transmited to hull 27, the reaction is thought to be a force at right angles to the impact which force is across the line of travel of the wave and is directed against the rotating forces. The movement of portions of the water in the lower half of the wave through the slit openings 37 enhances the diminishing or dispersing of rotational forces within the wave.

In addition to the foregoing action, the grid network also makes another contribution toward reducing the rolling effect of the waves against the hull. The grid network serves as a functional rolling chock. Each of the pockets of the grid network contains a pocket of water which has inertia. When the hull moves, each of these pockets presents its inertia against the adjacent vertical plate and an eddy resistance serving as a drag is established, when movement is imparted to the hull. In this instance then the grid network shown in FIG. 3 comprises rim plates 35, intermediate plates 36 and transverse plates 38 which act as a drag to reduce the movement of hull 27 to thereby further aid in stabilizing the vessel in response to wave action.

Moreover, that portion of the wave which proceeds in the direction of arrow 67 passes over the top of hull 27 and moves around the faired external surface of tank 30 which also has a minimal reaction to the wave force. Thus, the waves which do climb over the sloped top side 28 are diverted around the fairing of tank 30 to pass on overboard to the opposite side.

All vessels have basic requirements with respect to living accommodations, storage, fuel and water tanks and the like, which can conveniently be placed in the hull 27 as well as in tank 30. When the hull is decked over or provided with a deck such as upper deck 18, as shown in FIG. 2, there is provided a high free board level deck, well above both waves and spray and is free of deck housing encumbrances.

In addition, the arrangement of the winches 17, as shown in FIG. 2 with respect to the wells 16 provides a convenient place for carrying out certain operations underwater. As is well known, the amount of load which can be lifted is greater when it is supported over the center line of the vessel as opposed to over one side with the lever arm of the half beam. Hence, the winches 17 are so positioned with respect to well 16 that underwater pipe line repair work or the like can be made therethrough, or sunken vessels may be partially hoisted by cables passing therethrough. With the hoisting means in the form of winches 17 placed to make center line lifts, the capacity of the lifts would only be limited by either the structural strength of the vessel or by the extent of its bouyancy reserve. Hoisting may, for example, be by conventional wire line tackles or by drill pipe such as that used in oil well drilling wherein not only lifting operations but turning operations as well as pumping through can be accomplished. The drill pipe is racked on top of the upper deck 18 when not in use.

Any one or all of the wells 16, as shown in FIG. 2, could be used for diving operations. Since the bottom of the wells 16 have deep submergence, they serve as a barrier for the rotational and translational forces in the wave. There will of course be vertical surging in the wells 16 as the exterior hydrostatic head changes with each wave passage. Nevertheless, a diver using a well 16 is remote from the more turbulent action of the waves as he enters and leaves the water.

When it is desired to move the vessel from one location to another, the vessel will be raised with respect to the water line to the position shown in FIG. 7 for example. This is accomplished by once again applying pressurized air to ballast tank 52 to purge the water ballast therefrom.

When the grid network was described above, it was shown that the arrangement of the grid network offered resistance to rolling imparted by wave action as a result of the water retained in the downwardly facing pockets because of the inertia of the water and the resistance that the water had on the grid network. The same would be true when the vessel is in motion, either by being self propelled or in tow. To overcome this resistance, jet means are provided for the injection of a compressed gas, such as air, into the grid network.

As explained above, FIG. 3 shows such a jet means in connection with step shaped hull bottom 29. When compressed air is introduced at sufficient pressure through jets 43 to overcome the hydrostatic head of the hull depth, the water in the pockets formed by rim plates 35, intermediate plates 36 and transverse plates 38 will be displaced therefrom. This air will migrate from the ejection points into adjacent pockets through slit openings 37. If the hull is flat bottomed as shown in FIGS. 5, 6 and 7, uniform air pressure can be applied to displace all of the water since the hydrostatic head is the same across the entire bottom surface. However, if the hull is faired as in FIGS. 2 and 4, there is a variation in the depths of submergence for some of the pockets and the action thereon would be similar to that explained in respect to the step shaped hull shown in FIG. 3.

Reduced air pressure tank 51, as shown in FIGS. 6 and 7, for example, will be maintaining sufficient pressure to overcome the hydrostatic head at the lowermost hull level when the hull is at light draft as it will be when underway. In order that the air flow will not migrate to the least pressure point at the higher most grid pockets, regulating valves 44 are installed to establish a pressure graduation system, inversely scaled to the depth of submersion levels. In this manner, all sections of the hull grid system can be purged of water.

If there are enough ejection points or jets, enough air could be supplied so that there could be complete separation of the hull from the surrounding water. Resistance to forward motion, therefore, would be the friction of an air-water interface, which is low rather than steel plating and water interface which is high. The practical degree of the amount of ejection and the cost of the compressed air must be weighed against the propulsion efficiency gained for the general employment of the vessel. Although the grid network purging system of this invention has been described with respect to compressed air, it is to be understood that other compressed gases could be used as for example, exhaust gases from gas turbine engines could serve in some instances.

As indicated above, the compressed air which has been diverted to air tank 51, as shown in FIGS. 6 and 7, serves as a convenient air source for purging the grid network. Compressed air is very efficient in the handling of ballast, providing that precise differential pressure control is maintained. As explained above, the vessel is adapted to proceed to its work station at least possible draft, that is, minus ballast. On arrival, in order to get the leading edge of the inwardly and upwardly sloped top sides submerged a distance which is roughly equal to one half the depth of the wave, ballast would be taken on board in large quantities. If the ballast tanks, as for example, tank 52, as shown in FIGS. 6 and 7, are designed to carry sufficient air pressure to overcome the outside head of water, this ballast can be discharged rapidly later on by applying an air pressure to the top of the tank, thus, pressing the water overboard through the valve 53.

When the vessel arrives at destination and ballast is required, the air pressure in tank 52 can be either discharged to the atmosphere, in which case the energy is wasted, or it can be released to bouyancy tanks, such as tank 51, which are merely empty spaces. As the hull sinks because of the ingestion of ballast, the air pressure is merely transferred to a larger volume air accumulation tank, such as tank 51. The volume and pressure which can be stored in tank 51 will be proportional to the ratio of the volume of tank 51 to the volume of tank 52. This ratio must be such that there will be sufficient drop in the ballast tank pressure to allow water to enter the ballast tank 52, to cause the vessel to submerge the desired depth. Otherwise, when a balance has been achieved and enough ballast has not yet been ingested, the residual air pressure must be vented to the atmosphere.

In this manner, a very large volume of low pressure compressed air can be stored in tank 51, for example, for use in purging the grid network, for example network 49, as shown in FIGS. 6 and 7. Since the purging is carried out only when the vessel has been de-watered of ballast and the operating draft of the vessel is at a minimum, the stored air will be of sufficient pressure generally to purge the grid system.

FIG. 4 is a cross-sectional view of another vessel showing another embodiment of the invention herein. The hull is generally shown by the numeral 71 having inwardly and upwardly sloped top sides 72 and, sloped bottom 73 having grid networks 74 thereon. In addition, hull 71 is provided with a generally circular or cylindrical tank 75 extending upwardly therefrom which supports upper deck 76 which is supported at its ends by vertical deck supports 77 connected to the leading edge of sloped sides 72.

Tank 75 has passing down therethrough a shaft in the form of well 78 which communicates with the bottom of the hull. Deck 76 has mounted thereon winch 79 which is adapted to connect with tackle means 80 which is connected to a vessel, such as submarine 81.

Bottoms 73 of hull 71 are so shaped that they will cradle submarine 81 therein when submarine 81 is drawn adjacent to hull 71. Submarine 81 may be a small exploration type submarine and can thus be nested under the hull 71 by lifting on tackle 80 through the center line of well 78. Since units such as submarine 81 are by nature, faired shaped, they can become, when cradled, a conforming part of the hull and present no unusual resistances when the mother ship gets underway. In this manner, the submarine may be serviced through well 78, which is remote from the turbulent wave zone which would be present on the sides of the ship.

It is to be understood that grid network 74 is operated in the same manner as the grid network arrangement referred to and described in other embodiments of the invention and can be adapted for purging by compressed air when underway. In addition, hull 71 has ballasting means similar to that shown in FIGS. 6 and 7 so that the hull may be submerged the desired distance when in a support operating position.

Referring now to FIG. 5, a partial cross-section of another embodiment of the present invention is shown. In this instance, the hull is generally shown by numeral 84 and may be described as a flat bottomed hull. It has inwardly and upwardly sloped top sides 85 and a flat bottom 86 which has attached thereto another grid network comprising a plurality of plates 87 attached at generally right angles to bottom 86 as by welding and connected together by transverse plates 88, thereby forming generally downwardly extending pockets similar to those described with respect to FIG. 3. Certain of the plates 87 have slit openings 89 which are similar to slit openings 37, shown in FIG. 3, and serve the same purpose. Hull 84 is also provided with tank 90 which corresponds with tank 30 in FIG. 3 and which has a well (not shown) passing vertically downwardly therethrough.

Hull 84 also has mounted therein enclosed pressure tank 91 which serves as a compressed air supply source for the passage of air through conduit 92 to air jets 93 and operate in the same manner as air jets 43, as shown in FIG. 3.

In addition, the embodiment as shown in FIG. 5, has what may be referred to as a grid network on both the sloped side 85 and on the top of the hull 84 which, in certain embodiments, serves a useful function. In this instance, the grid systems are comprised of a plurality of plates 95 attached generally at right angles with the sloped side 85 and the top of hull 84 and connected by cross or transverse plates 96 thereby forming a plurality of upwardly facing open ended pockets. In addition, each of the plates 95 is provided with slit openings 97 which are similar to slit openings 89.

Hence, the grid network on the sloped side 85 and top of hull 84 when provided in the manner as shown in FIG. 6, impede the flow of the waves over the hull and thereby reduce impact velocities. The slit openings 97 permit the upwardly facing pockets to drain water therefrom after each wave action so that a greater percentage of the wave force is dissipated as it moves across the top of hull 84.

Further modifications may be made in the invention as particularly described without departing from the scope of the invention. Accordingly, the foregoing description is to be construed as illustratively only and is not to be construed as a limitation upon the invention as defined in the following claims.

What is claimed is:

1. A seagoing vessel which is adapted for operation in open sea comprising:
   a hull having inwardly and upwardly sloped top sides;
   a grid network attached to the bottom side of the hull, said grid network comprising a plurality of grid plates attached at generally right angles to the bottom surface of the hull and forming a plurality of generally downwardly facing open ended pockets;
   at least one generally cylindrical shaped tank mounted on top the hull and adapted to support a deck thereabove;
   and ballasting means for raising and lowering the hull a predetermined distance relative to the water surface at predetermined times whereby the leading edges of the sloped top sides may be submerged below the water surface when the vessel is engaged in a support operation.

2. The vessel as claimed in claim 1 wherein:
   the tank and hull are provided with at least one vertical shaft extending from the top of the tank down through the hull for carrying out work operations therethrough.

3. The vessel as claimed in claim 1 including:
   jet means connected to the grid network for applying compressed gas to the closed ends of at least a portion of the pockets at predetermined times to thereby reduce drag forces when the vessel is underway.

4. The vessel as claimed in claim 1 having:
   a plurality of generally cylindrical shaped tanks mounted on top the hull, with at least one of said tanks having a vertical shaft extending from the top thereof down through the hull for carrying out work operations therethrough, and
   an upper deck attached to and supported by the tanks.

5. The vessel as claimed in claim 1 wherein:
   a portion of the grid plates comprising the grid network are provided with slit openings that run generally parallel with surface of the hull and adjacent thereto.

6. The vessel as claimed in claim 1 wherein:
   the bottom hull is step shaped having a plurality of steps from the lower edge of the sloped top side to the bottom of the hull, and
   with at least a portion of said steps having downwardly facing open ended pockets forming part of the grid network.

7. The vessel as claimed in claim 1 including:
   a second grid network attached to the sloped top sides of the hull and comprising a plurality of plates attached at generally right angles to the surface of the top sides and forming a plurality of generally upwardly facing open ended pockets.

8. The vessel as claimed in claim 1 including:
   a second grid network attached to the sloped top sides of the hull and to the top of the hull and comprising a plurality of plates attached thereto at generally right angles and forming a plurality of generally upwardly facing open ended pockets.

9. The vessel as claimed in claim 1 wherein:
   the tank and hull are provided with at least one vertical shaft extending from the top of the tank down through the hull for carrying out work operations therethrough;
   jet means connected to said grid network for applying compressed gas to the closed ends of at least a portion of the pockets at predetermined intervals to thereby reduce drag forces when the vessel is underway, and
   a portion of said grid plates are provided with slit openings that run generally parallel with the surface of the hull where attached and adjacent thereto, whereby released gas may migrate from the pocket where release to and adjacent pocket through said slit openings to thereby purge water therefrom.

10. The vessel as claimed in claim 4 and including:
jet means connected to the grid network for applying compressed gas to the closed ends of at least a portion of the pockets at predetermined times, to thereby purge water therefrom and to reduce drag forces when the vessel is underway.

No references cited.

MILTON BUCHLER, *Primary Examiner.*

T. M. BLIX, *Assistant Examiner.*